United States Patent
Zheng et al.

(10) Patent No.: US 10,388,213 B2
(45) Date of Patent: Aug. 20, 2019

(54) DISPLAY AND DISPLAY INTEGRATION METHOD

(71) Applicant: Microsoft Technology Licensing, LLC, Redmond, WA (US)

(72) Inventors: Ying Zheng, Sammamish, WA (US); Rajesh Manohar Dighde, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 15/601,594

(22) Filed: May 22, 2017

(65) Prior Publication Data

US 2018/0336818 A1 Nov. 22, 2018

(51) Int. Cl.
G09G 3/20 (2006.01)
G02F 1/1345 (2006.01)
G09G 3/3225 (2016.01)

(52) U.S. Cl.
CPC ....... *G09G 3/3225* (2013.01); *G02F 1/13452* (2013.01); *G09G 3/2096* (2013.01); *G09G 2300/0408* (2013.01); *G09G 2300/0426* (2013.01); *G09G 2310/0264* (2013.01)

(58) Field of Classification Search
None
See application file for complete search history.

(56) References Cited

U.S. PATENT DOCUMENTS

| | | | |
|---|---|---|---|
| 2004/0183484 A1 | 9/2004 | Ide et al. | |
| 2007/0216291 A1 | 9/2007 | Jung | |
| 2008/0165139 A1* | 7/2008 | Hotelling | G06F 3/041 345/173 |
| 2009/0090694 A1 | 4/2009 | Hotelling et al. | |
| 2010/0321305 A1 | 12/2010 | Chang et al. | |
| 2012/0026138 A1 | 2/2012 | Imai et al. | |
| 2012/0218219 A1 | 8/2012 | Rappoport et al. | |
| 2013/0341597 A1 | 12/2013 | Kim | |
| 2014/0042406 A1 | 2/2014 | Degner et al. | |
| 2014/0103315 A1 | 4/2014 | Jung et al. | |
| 2014/0160696 A1 | 6/2014 | Lee et al. | |
| 2016/0240605 A1 | 8/2016 | Lee et al. | |

(Continued)

FOREIGN PATENT DOCUMENTS

KR 20150039537 A 4/2015

OTHER PUBLICATIONS

"Well-proven Approach from NXP Reduces Medical System Design Costs", In White Paper of NXP, Jul. 2012, 9 pages.

(Continued)

*Primary Examiner* — Gustavo Polo
(74) *Attorney, Agent, or Firm* — Holzer Patel Drennan

(57) ABSTRACT

A device is disclosed that includes a display panel, a cover glass, and a printed circuit board. The display panel emits light and the cover glass passes the light from the display panel. The display panel includes traces to carry control signals, the cover glass includes traces to carry control signals, and a printed circuit board has traces to carry control signals. The display panel may be connected to the cover glass such that the traces on the display panel are connected to the traces on the cover glass. The printed circuit board may be connected to the cover glass such that the traces on the PCB are connected to the traces on the cover glass.

20 Claims, 9 Drawing Sheets

(56) References Cited

U.S. PATENT DOCUMENTS

2016/0259368 A1     9/2016   Bibl et al.
2018/0246581 A1*   8/2018   Omata .................. G06F 3/0202

OTHER PUBLICATIONS

"International Search Report and Written Opinion issued in PCT Application No. PCT/US2018/028984," dated Jul. 19, 2018, 28 Pages.

* cited by examiner

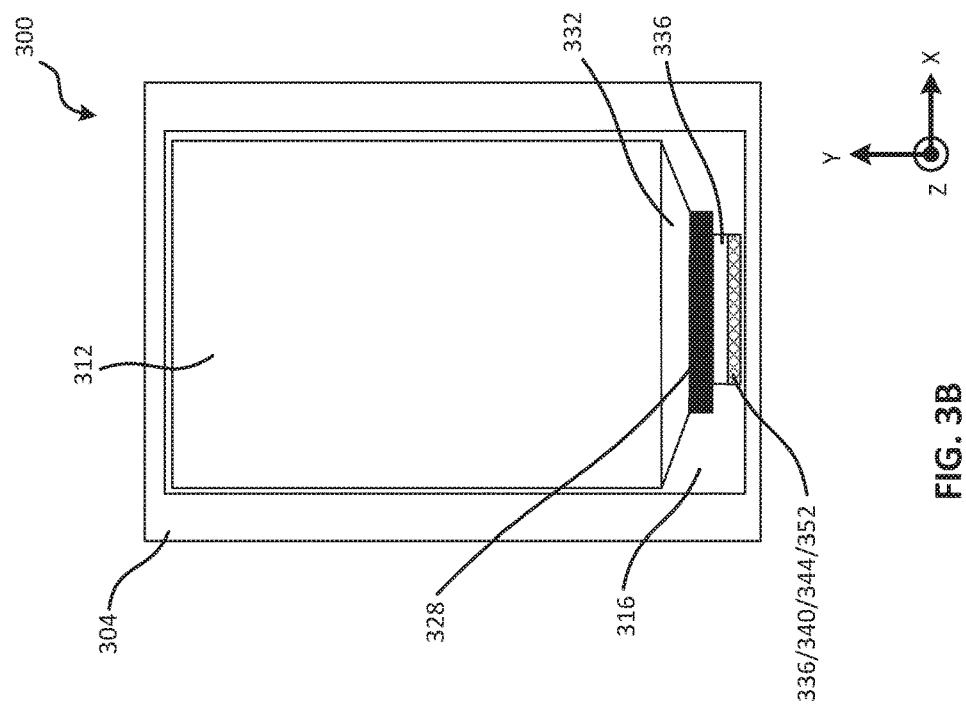
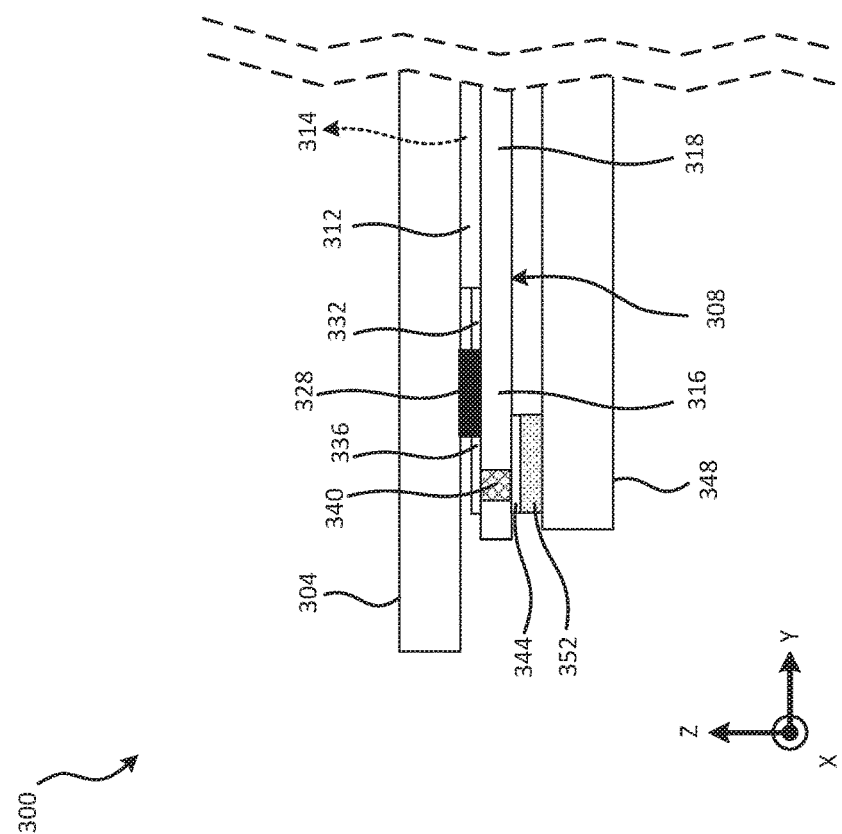
FIG. 3B
FIG. 3A

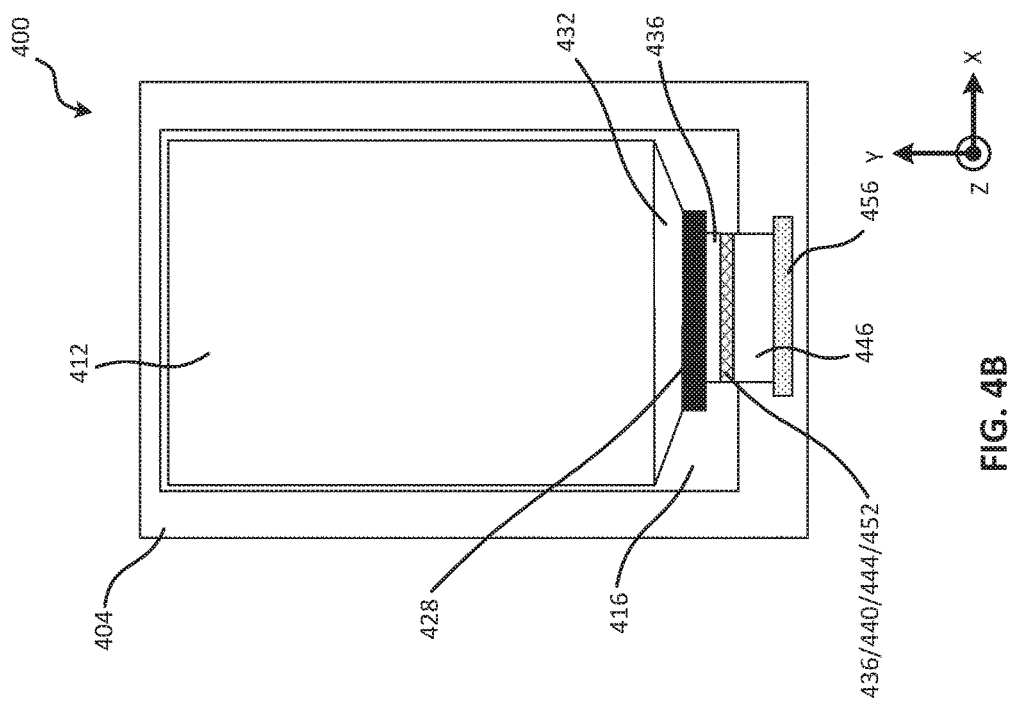
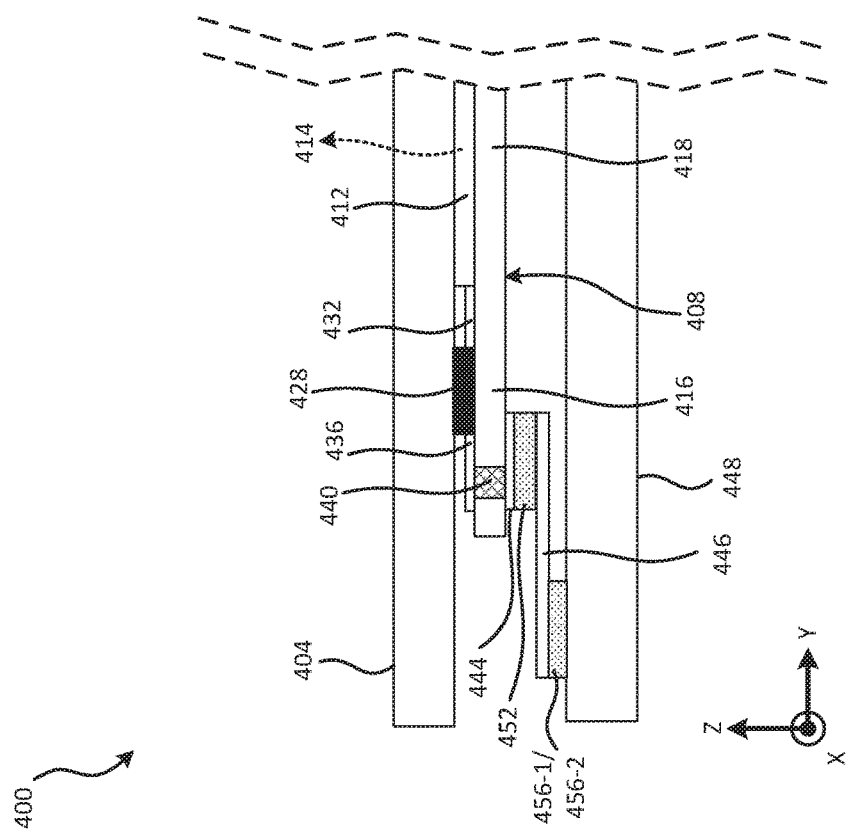
FIG. 4A
FIG. 4B

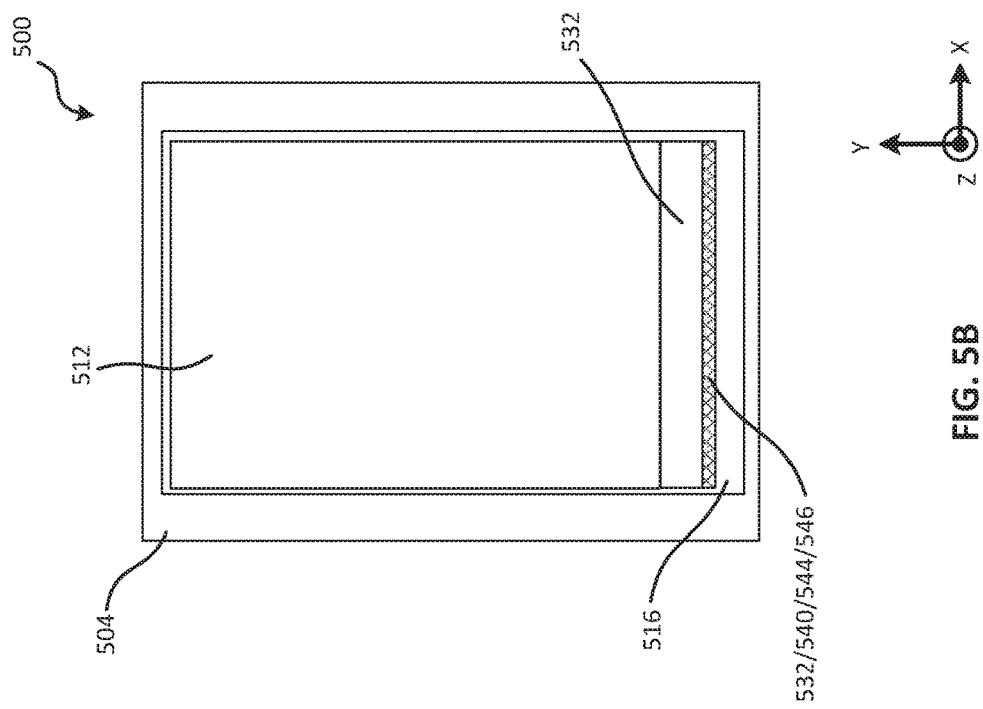
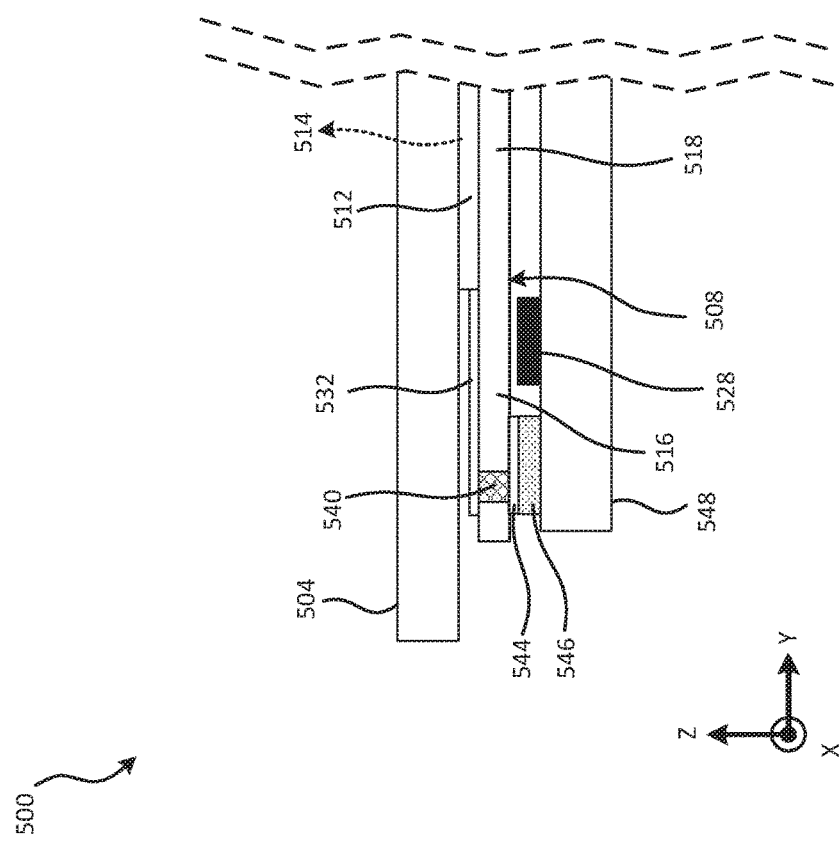

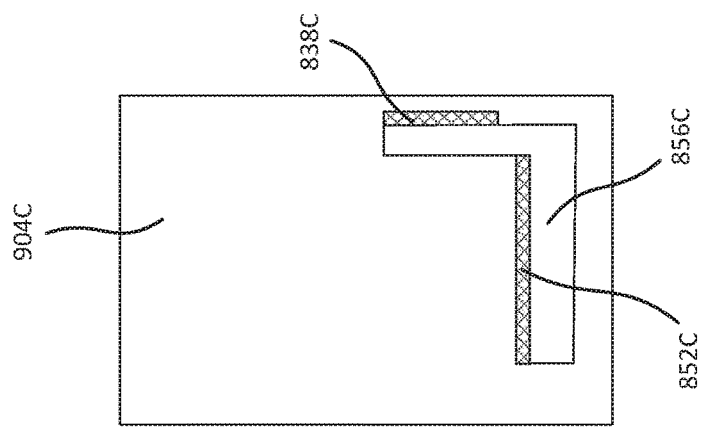
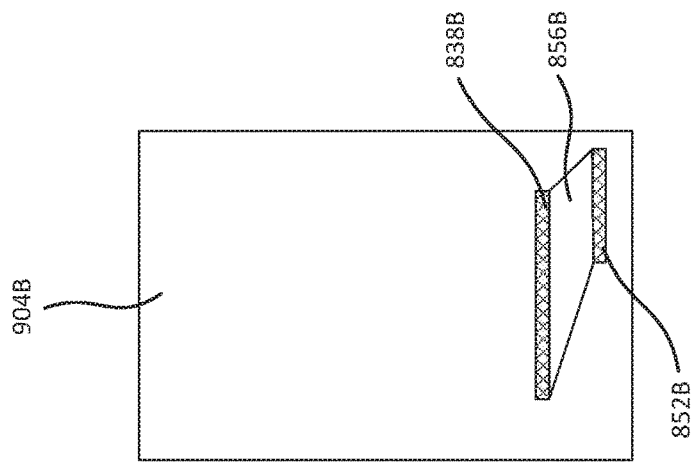
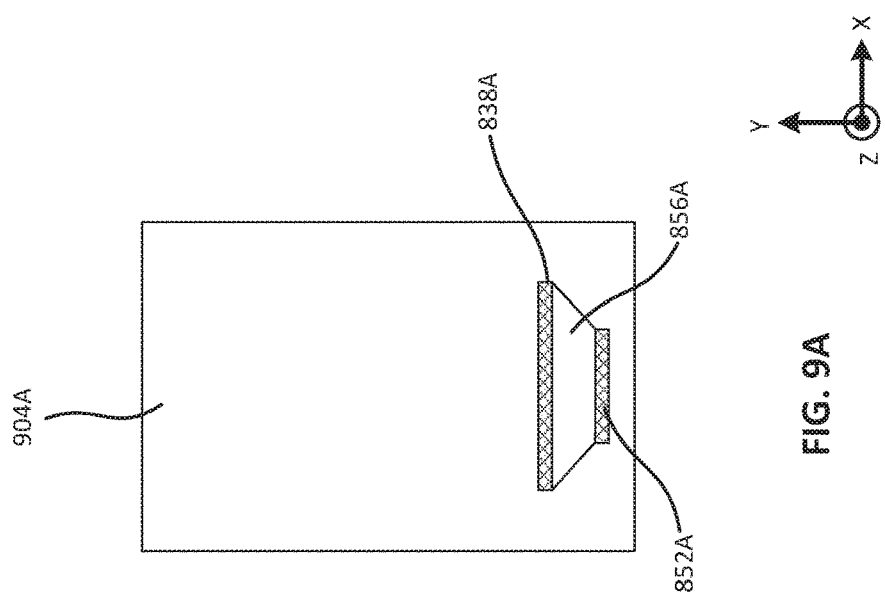

DISPLAY AND DISPLAY INTEGRATION METHOD

BACKGROUND

Consumers often prefer that mobile devices, such as tablet computers, mobile telephones, and laptops, are thin, light, and compact. To achieve thin, light, and compact devices, designers and manufacturers continuously look for ways to reduce the bezel width and thickness of the displays within these devices.

BRIEF DESCRIPTION OF THE DRAWINGS

FIG. 3A illustrates a cross-sectional view of an exemplary display in one embodiment;

FIG. 3B illustrates the exemplary display of FIG. 3A as viewed from above;

FIG. 4A illustrates a cross-sectional view of an exemplary display device in one embodiment;

FIG. 4B illustrates the exemplary display of FIG. 4A as viewed from above;

FIG. 5A illustrates a cross-sectional view of an exemplary display device in one embodiment;

FIG. 5B illustrates the exemplary display of FIG. 5A as viewed from above;

FIGS. 9A, 9B, and 9C illustrate exemplary fan-in traces on cover glass.

DESCRIPTION

The following detailed description refers to the accompanying drawings. The same reference numbers in different drawings may identify the same or similar elements. Also, the following detailed description is exemplary and explanatory only and is not restrictive of the invention, as claimed.

Device manufactures continuously try to increase reliability of displays while reducing the thickness of displays and the width of the display bezels. Embodiments described below may allow for displays that are thinner and have smaller bezels, while being more reliable.

Figure 1:
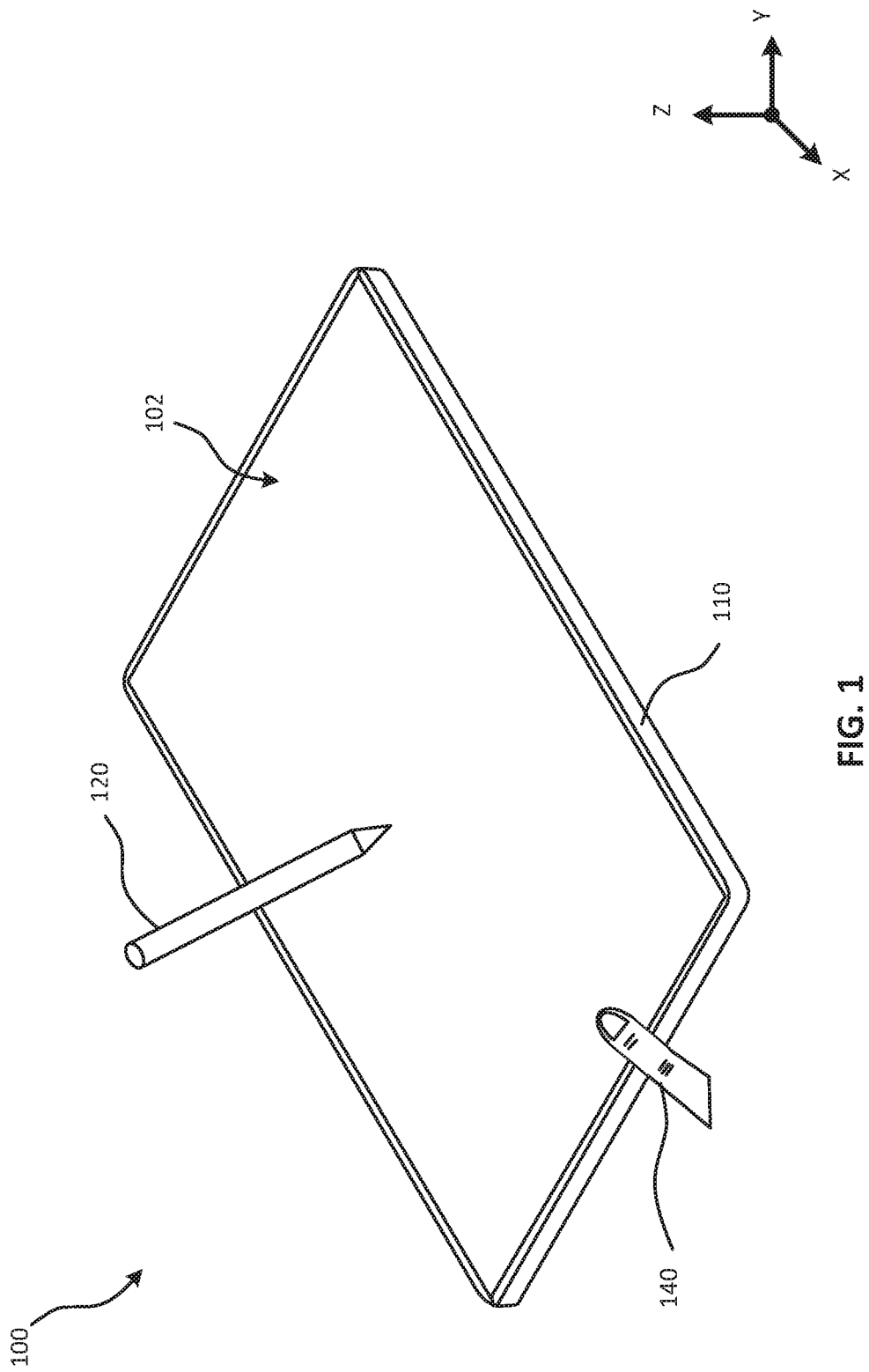
FIG. 1 illustrates an exemplary display device in one embodiment.

FIG. 1 is a perspective view of an exemplary display device 100 manifest as a tablet computer. Display device 100 includes a display 102 surrounded by a housing 110 to encompass and protect the components of display device 100, including display 102. Display 102 shows images or video for viewing by a user. A user may interact with display device 100 with a stylus or pen 120 or fingertip 140. Although display device 100 is shown as a tablet computer in FIG. 1, display device 100 may be a mobile phone, a laptop, or any other device with a display for viewing. FIG. 1 also defines an x-axis, y-axis, and z-axis such that the exposed layer of display 102 is the "top most" layer and the "bottom" of display device 100 is not visible in FIG. 1. These terms are relative and may be interchanged.

Figure 2:
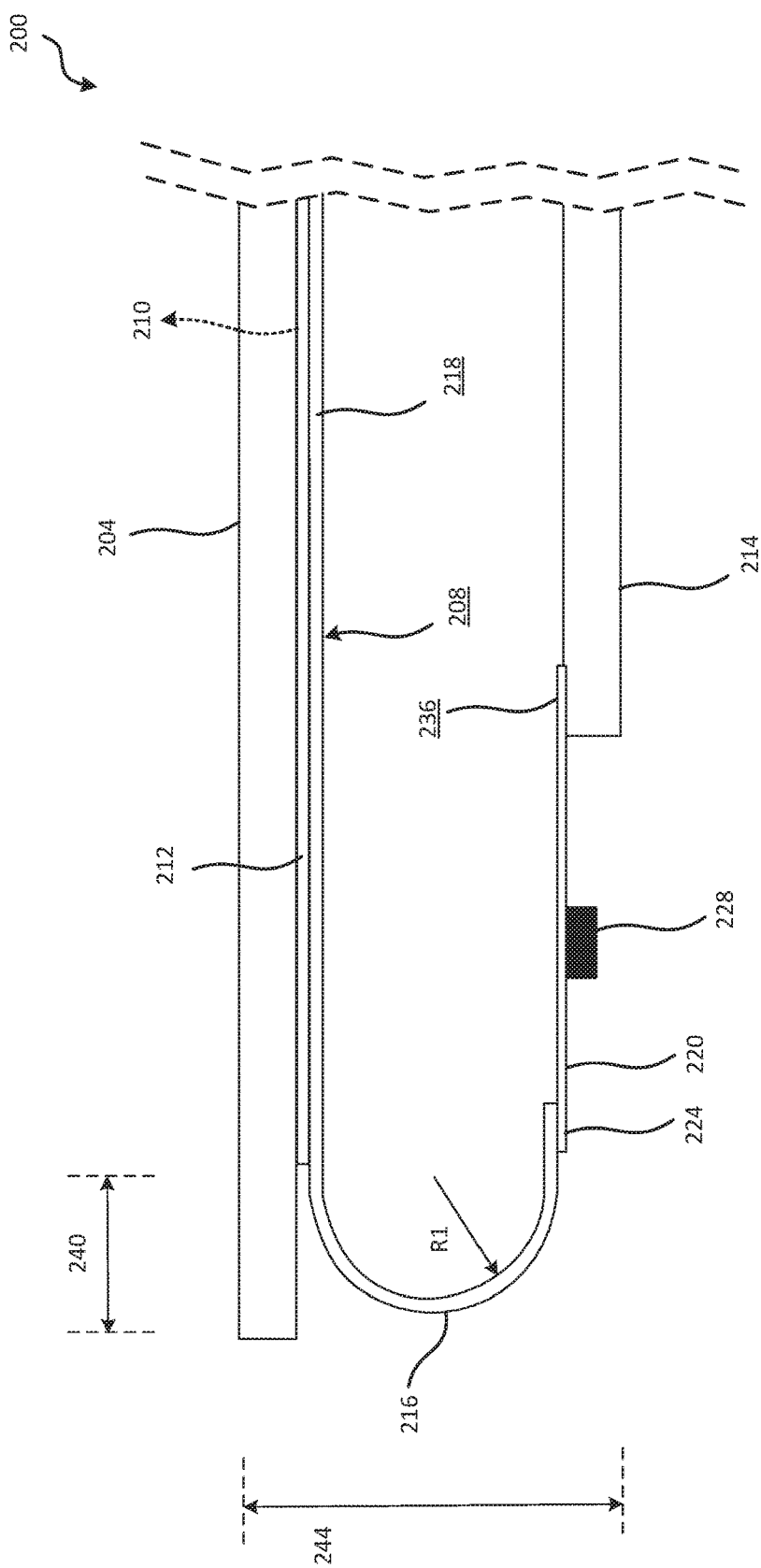
FIG. 2 illustrates a cross sectional view of components of an exemplary display.

FIG. 2 illustrates a cross sectional view of components of an exemplary display 200. The components of display 200 may be incorporated, for example, into display 102 of display device 100 shown in FIG. 1. Display 200 includes a cover glass 204 and an organic light-emitting diode (OLED) panel 208 with an active area 212 and an inactive area 216. Active area 212 includes an array of light-emitting diodes (LEDs) with a film of organic compound that emits light 210. Inactive area 216 of display 200 bends with a radius R1 from the top of display 200 to the bottom of display 200. In this example, OLED panel 208 is "top-emitting" in that light passes through cover glass 204 without passing through a substrate 218 on which active area 212 sits.

Inactive area 216 includes conductors (traces), such as fan-out traces, that conduct and carry signals from a flexible printed circuit (FPC) 220 to active area 212 of display 200. As shown, inactive area 216 is connected to FPC 220 with an anisotropic conductive film (ACF) bond at location 224. Driver circuit 228, mounted on FPC 220, provides the signals to drive the active area 212 of OLED panel 208. The signals from driver circuit 228 are carried by conductive traces on FPC 220 and conductive traces on inactive area 216 to active area 212. Driver circuit 228 may be a display driver integrated circuit (DDIC), such as a chip. FPC 220 may then be connected to a printed circuit board (PCB) 232 with an ACF bond at location 236. PCB 214 may be a rigid or a flexible circuit board, or a combination of rigid and flexible circuit boards. PCB 214 may include system components of the device that incorporates display 200, such as the central processing unit (CPU), memory, hard disk drive (HDD), and/or solid-state drive (SSD).

To decrease the border area 240 (the bezel) and/or the thickness 244 of display 200, radius R1 can be reduced. Reducing radius R1, however, may increase the failure rate of inactive area 216 and/or traces on inactive area 216. Further, as display resolution increases, inactive-area 216 includes a greater number of conductors and traces, which also complicates reducing radius R1. Display 200 also includes two ACF bonds at locations 224 and 236 and a driver circuit mounted on FPC 220. These connections also complicate and reduce the reliability of display 200. Embodiments described below may allow for more reliable displays that are thinner with a narrower bezel—without concern for radius R1 in some embodiments.

Display 200 shown in FIG. 2 is exemplary and display 200 could include more, fewer, different, or a different arrangement of components. For example, OLED panel 208 could alternatively be "bottom-emitting" in that light could pass through substrate 218 before passing through cover glass 204. Further, display 200 may include a display panel other than an OLED panel, such as a liquid-crystal display (LCD) panel, a Quantum-Dot Light-Emitting Diode (QLED) panel, an E-ink panel, or any other type of flat panel display.

FIG. 3A illustrates a cross-sectional view of components of an exemplary display 300 in one embodiment. FIG. 3B illustrates exemplary display 300 as viewed from above. The components of display 300 may be incorporated, for example, into display 102 of display device 100 shown in FIG. 1. Display 300 includes a cover glass 304 and an OLED panel 308 with an active area 312 and an inactive area 316. Active area 312 includes an array of LEDs with a film of organic compound that emits light 314. In this example, OLED panel 308 is top-emitting in that light passes through cover glass 304 without passing through substrate 318 on which active area 312 sits. In the embodiment of FIG. 3A, a driver circuit 328 is mounted on OLED panel 308. Driver circuit 328 may be a DDIC in the form of a chip. Thus, if OLED panel 308 is plastic, driver circuit 328 can be considered a "chip on panel" or, if OLED panel 308 is glass, driver circuit 328 can be considered a "chip on glass." Inactive area 312 includes fan-out traces 332 and fan-in traces 336 that may be formed on OLED panel 308. Fan-out traces 332 include conductors that carry signals, such as control signals, from driver circuit 328 to active area 312 of OLED panel 308. Fan-in traces 336 include conductors that carry signals, such as control signals, from vias 340 to driver circuit 328.

Inactive area 316 of OLED panel 308 includes vias 340 that conduct and carry signals from one side of OLED panel 308 (from traces 344 on the bottom of panel 308) to the other side of OLED panel 308 (to fan-in traces 336 in inactive area 316). Traces 344 may be formed on the bottom side of panel 308 and can be connected by an ACF bond to a PCB 348 at location 352. Traces 344 are conductive and can carry signals, such as control signals. PCB 348 may be a flexible PCB (i.e., FPCB), a rigid PCB, or a combination of the two (a "rigid-flex" PCB). PCB 348 may also be the system board for mounting major components of the device that includes display 300, such as the CPU, memory, HDD, and/or SSD.

The embodiment of display 300 allows driver circuit 328 to be connected directly to OLED panel 308, potentially reducing the length of fan-out traces 332. Reducing the length of fan-out traces can be beneficial because fan-out traces are numerous (i.e., more numerous than fan-in traces), for example. In addition, vias 340 allow for signals to be carried from one side (the bottom) of OLED panel 308 to the other side (top) without bending inactive area 316 of OLED panel 308. In addition, display 300 allows for the connection of PCB 348 to OLED panel 308 directly (through an ACF bond at location 352) without an FPC (as compared to display 200 of FIG. 2) and without a board-to-board connector, for example. The embodiment of display 300 may allow for a thinner display with a narrower bezel while making the connections more reliable.

Display 300 shown in FIGS. 3A and 3B is exemplary and display 300 could include more, fewer, different, or a different arrangement of components. For example, the components of display 300 are not drawn to scale. ACF bond at location 352 may be narrower and shorter. Fan-out traces 332 and fan-in traces 336 may have a lower profile. Further, the space (if any) between PCB 348 and OLED panel 308 may be smaller. In addition, although display 300 is described without bending inactive area 316, some embodiments may nonetheless bend inactive area 316 or other parts of display panel 308. Display 300 may include a display panel other than an OLED panel, such as an LCD panel, a QLED panel, an E-ink panel, or any other type of flat panel display.

FIG. 4A illustrates a cross-sectional view of components of an exemplary display device 400 in one embodiment. FIG. 4B illustrates exemplary display 400 as viewed from above. The components of display 400 may be incorporated, for example, into display 102 of display device 100 shown in FIG. 1. Display 400 includes a cover glass 404 and an OLED panel 408 with an active area 412 and an inactive area 416. Display 400 is similar to display 300 in many respects. For example, active area 412 includes an array of LEDs with a film of organic compound that emits light 414. OLED panel 408 is top-emitting in that light passes through cover glass 404 without passing through substrate 418 on which active area 412 sits. A driver circuit 428 is mounted on OLED panel 408. Driver circuit 428 may be a DDIC in the form of a chip. If OLED panel 408 is plastic, driver circuit 428 can be considered a "chip on panel" or, if OLED panel 408 is glass, driver circuit 428 can be considered a "chip on glass." Inactive area 412 includes fan-out traces 432 and fan-in traces 436 that may be formed on OLED panel 408. Fan-out traces 432 include conductors that carry signals, such as control signals, from driver circuit 428 to active area 412 of OLED panel 408. Fan-in traces 436 include conductors that carry signals, such as control signals, from vias 440 to driver circuit 428. Inactive area 416 of OLED panel 408 includes vias 440 that conduct and carry signals from one side of OLED panel 408 (from traces 444 on the bottom of panel 408) to the other side of OLED panel 408 (to fan-in traces 436 in inactive area 416). Traces 444 are conductive and can carry signals, such as control signals.

Unlike display 300, OLED panel 408 is not directly connected to PCB 448. In the embodiment of FIGS. 4A and 4B, traces 444, formed on the bottom side of panel 408, are connected by an ACF bond to an FPC 446 at location 452. FPC 446 carries signals to and/or from a connector 456-1 that mates with a corresponding connector 456-2 on PCB 448. PCB 448 may be a flexible printed circuit board, a rigid printed circuit board, or a rigid-flex printed circuit board. PCB 448 may also be the system board for mounting major components of the device that includes display 400, such as the CPU, memory, HDD, and/or SSD.

As compared to display 300, display 400 adds complexity by the addition of an FPC 446 and a connector 456. On the other hand, FPC 446 and connector 456 adds flexibility to the manufacture and assembly of display 400. For example, OLED panel 408 (with FPC 446 and connector 456-1) may be manufactured and sold by one supplier, and PCB 448 (with connector 456-2) may be manufactured and sold by another supplier. In this case, the two separate components or modules may be assembled (into display device 100, for example) by connecting connector parts 456-1 and 456-2.

Display 400 shown in FIGS. 4A and 4B are exemplary and display 400 could include more, fewer, different, or a different arrangement of components. For example, rather than employing connector 456, display 400 may use an ACF bond to connect FPC 446 and PCB 448. In addition, connection at location 452 may alternatively or additionally include a connector rather than an ACF bond. In another embodiment, FPC 446 and connector 456 may extend in the other direction below OLED panel 408 rather than to the side. In addition, although display 400 is described without bending inactive area 416, some embodiments may nonetheless bend inactive area 416 or other parts of display panel 408. Further, the components of display 400 are not drawn to scale. For example, connector 456 may lie beneath panel 408 rather than to the side. Display 400 may include a display panel other than an OLED panel, such as an LCD panel, a QLED panel, an E-ink panel, or any other type of flat panel display.

FIG. 5A illustrates a cross-sectional view of components of an exemplary display device 500 in one embodiment. FIG. 5B illustrates exemplary display 500 as viewed from above. The components of display 500 may be incorporated, for example, into display 102 of display device 100 shown in FIG. 1. Like displays 300 and 400, display 500 includes a cover glass 504 and an OLED panel 508 with an active area 512 and an inactive area 516. Active area 512 includes an array of LEDs with a film of organic compound that emits light 514. OLED panel 508 is top-emitting in that light passes through cover glass 504 without passing through substrate 518 on which active area 512 sits. Inactive area 516 includes fan-out traces 532 that may be formed on the top of OLED panel 508. Fan-out traces 532 include conductors that carry signals, such as control signals, to active area 512 of OLED panel 508. Inactive area 516 of OLED panel 508 includes vias 540 that conduct and carry signals, such as control signals, to the top side of OLED panel 508 from the bottom side of OLED panel 508.

Unlike displays 300 and 400, display 500 includes a driver circuit 528 that is mounted on a PCB 548 rather than an OLED panel 508 (as in displays 300 and 400). Thus, fan-out traces 532 that carry signals, such as control signals, to active area 512 carry the signals from vias 540 rather than directly from a driver circuit. Traces 544 may be formed on the bottom side of panel 508 and can be connected at location 546 with an ACF bond to PCB 548, to which driver circuit 528 is mounted. Traces 544 are conductive and can carry signals, such as control signals. Therefore, vias 540 carry signals from driver circuit 528 underneath OLED panel 508 to the top of OLED panel 508. PCB 548 may be a flexible printed circuit board, a rigid printed circuit board, or a rigid-flex printed circuit board. PCB 548 may also be the system board for mounting major components of the device that includes display 500, such as the CPU, memory, HDD, and/or SSD. Driver circuit 528 may be a DDIC in the form of a chip.

Like display 300, display 500 includes a direct connection between PCB 548 and OLED panel 508 (through an ACF bond at location 546) without an FPC and without a board-to-board connector, for example. Like displays 300 and 400, vias carry signals from one side of OLED panel 508 to the other without bending inactive area 516 of OLED panel 508. Unlike displays 300 and 400, driver circuit 528 is mounted on PCB 548 rather than OLED panel 508, changing the type of signal carried by vias 540. In some embodiments, signals from driver circuit 528 (ultimately delivered to active area 512) may be greater in number than signals to driver circuit 528. Therefore, display 500 may include more vias 540 than display 300 has vias 340, for example. Although display 500 may increase complexity by increasing the number of vias, display 500 may be able to situate OLED panel 508 closer to cover glass 504 than OLED panel 308 to cover glass 304 in display 300, for example. Thus, the embodiment of display 500 may allow for a thinner display with a narrower bezel while making the connections more reliable.

Display 500 shown in FIGS. 5A and 5B is exemplary and display 500 could include more, fewer, different, or a different arrangement of components. For example, rather than employing an ACF bond at location 546 between PCB 548 and inactive area 516, display 500 may employ an FPC and a connector similar to that shown for display 400 in FIG. 4A (with the alternatives discussed above). In addition, although display 500 is described without bending inactive area 516, some embodiments may nonetheless bend inactive area 516 or other parts of display panel 508. Further, the components of display 500 are not drawn to scale. Display 500 may include a display panel other than an OLED panel, such as an LCD panel, a QLED panel, an E-ink panel, or any other type of flat panel display.

Figure 6B:
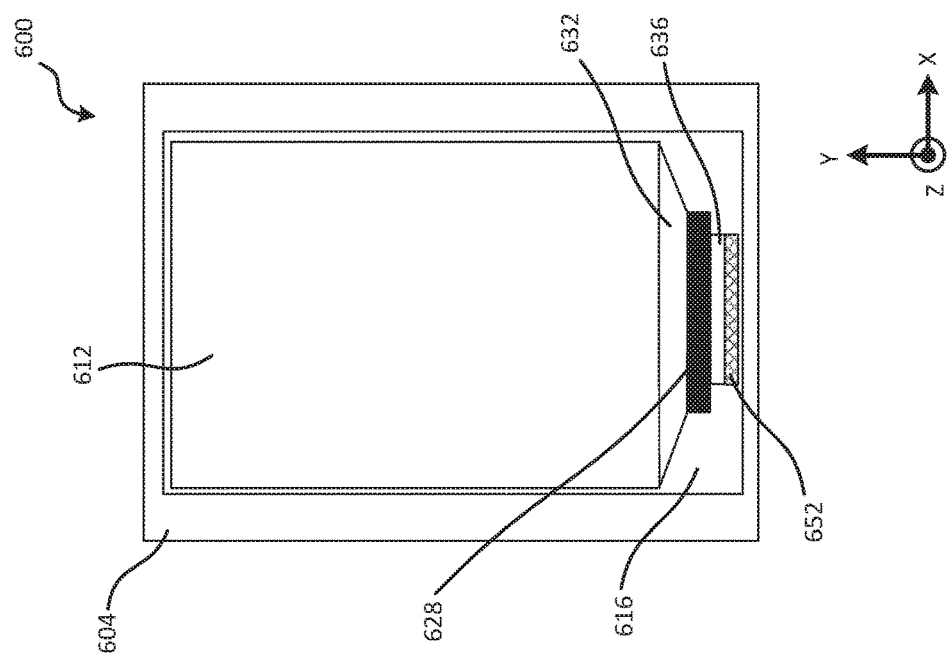
FIG. 6B illustrates the exemplary display of FIG. 6A as viewed from above.
Figure 6A:
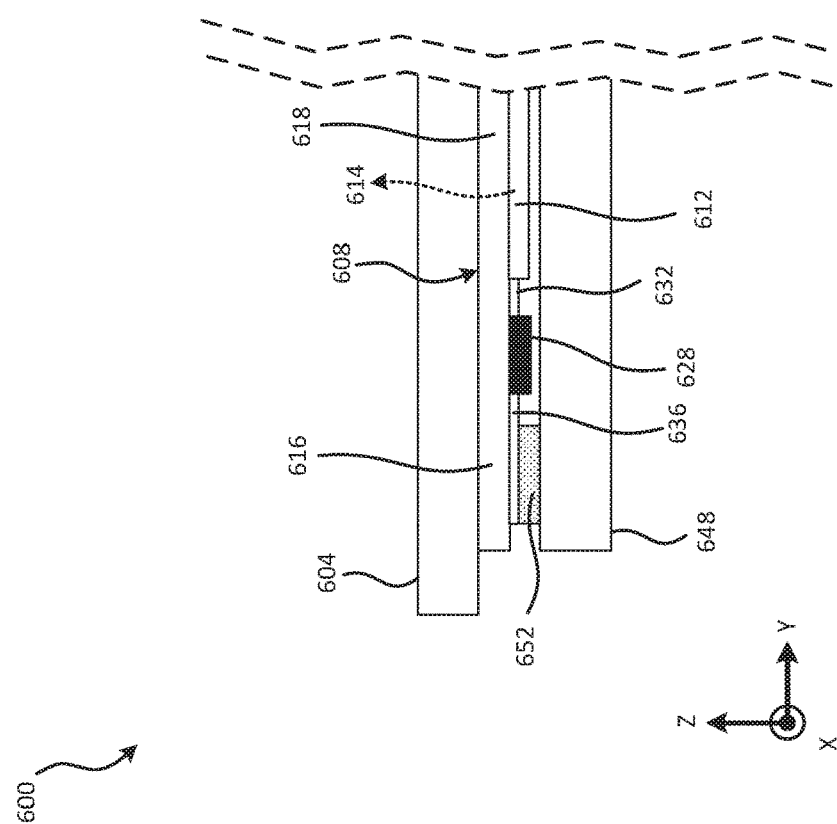
FIG. 6A illustrates a cross-sectional view of an exemplary display device in one embodiment.

FIG. 6A illustrates a cross-sectional view of components of an exemplary display device 600 in one embodiment. FIG. 6B illustrates exemplary display 600 as viewed from above. The components of display 600 may be incorporated, for example, into display 102 of display device 100 shown in FIG. 1. Like displays 300, 400, and 500, display 600 includes a cover glass 604 and an OLED panel 608 with an active area 612 and an inactive area 616. Active area 612 includes an array of LEDs with a film of organic compound that emits light 614. Unlike displays 300, 400, and 500, OLED panel 608 is bottom-emitting in that light passes through substrate 618, on which active area 612 sits, before passing through cover glass 604.

Like displays 300 and 400, display 600 includes a driver circuit 628 that is mounted on OLED panel 608 (although on the bottom side of OLED panel 608 since it is flipped relative to OLED panels 308 and 408). Driver circuit 628 may be a DDIC in the form of a chip. If OLED panel 608 is plastic, driver circuit 628 can be considered a "chip on panel" or, if OLED panel 608 is glass, driver circuit 628 can be considered a "chip on glass." Inactive area 616 of display 600 includes fan-out traces 632 and fan-in traces 636 that may be formed on the bottom of OLED panel 608. Fan-out traces 632 include conductors that carry signals, such as control signals, from driver circuit 628 to active area 612 of OLED panel 608. Fan-in traces 636 include conductors that carry signals, such as control signals, from a PCB 648 to driver circuit 628. Fan-in traces 636 can be connected by an ACF bond to PCB 648 at location 652. PCB 648 may be a flexible PCB, a rigid PCB, or a rigid-flex PCB. PCB 648 may also be the system board for mounting major components of the device that includes display 600, such as the CPU, memory, HDD, and/or SSD.

Like displays 300 and 400, display 600 allows driver circuit 628 to be connected directly to OLED panel 608, potentially reducing the length of fan-out traces 632. Bottom-emitting OLED panel 608 allows for PCB 648 to connect to OLED panel 608 without vias (such as vias 340) carrying signals from one side (the bottom) of OLED panel 308 to the other side (top). Nonetheless, display 600 allows for the connection of PCB 648 and OLED panel 608 without bending inactive area 616 of OLED panel 608. In addition, display 600 allows for the connection of PCB 648 to OLED panel 608 directly (through an ACF bond at location 652) without an FPC (as compared to display 200 of FIG. 2) and without a board-to-board connector, for example. Thus, the embodiment of display 600 may allow for a thinner display with a narrower bezel while making the connections more reliable.

Display 600 shown in FIGS. 6A and 6B is exemplary and display 600 could include more, fewer, different, or a different arrangement of components. For example, rather than employing an ACF bond at location 652 between PCB 648 and inactive area 616, display 600 may employ an FPC (ACF bonded to inactive area 616) and a connector (between the FPC and PCB 648), similar to the connection shown and described for display 400 in FIG. 4A. Further, the components of display 600 are not drawn to scale. Display 600 may include a display panel other than an OLED panel, such as an LCD panel, a QLED panel, an E-ink panel, or any other type of flat panel display.

Figure 7B:
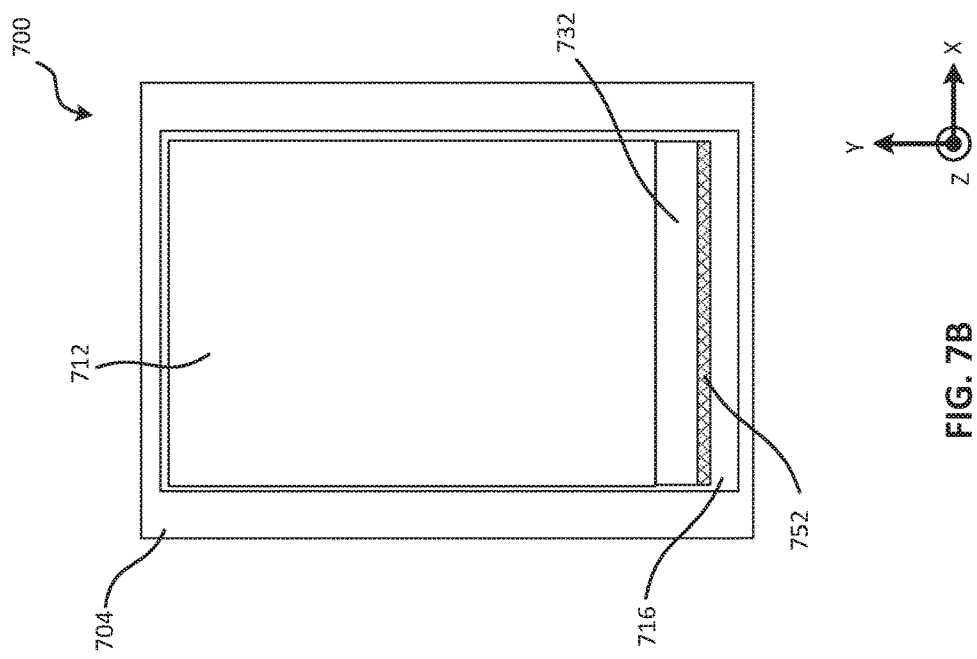
FIG. 7B illustrates the exemplary display of FIG. 7A as viewed from above.
Figure 7A:
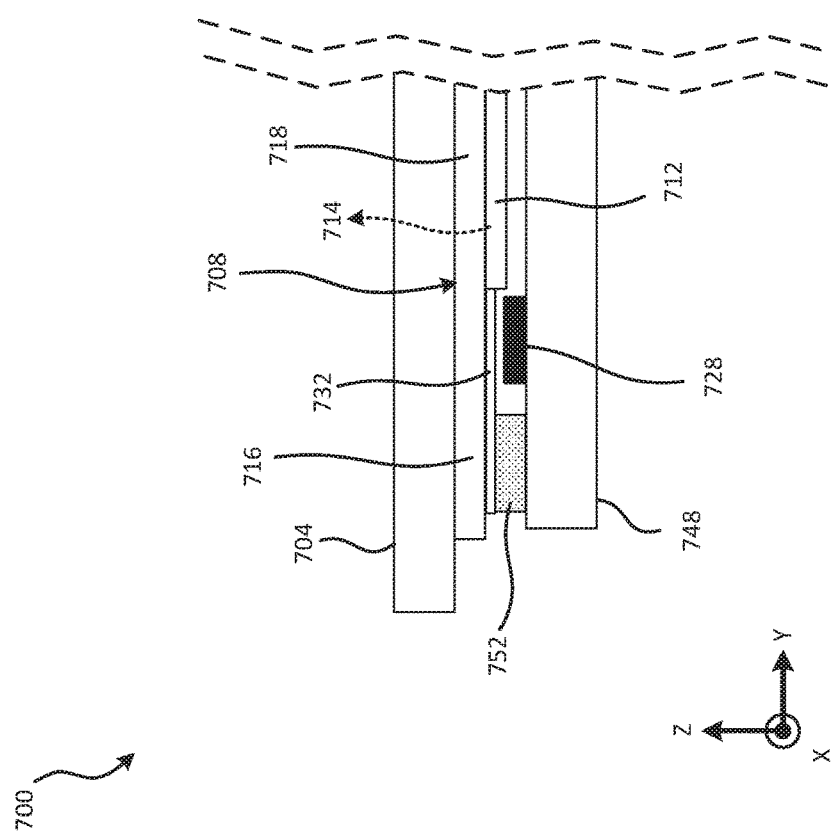
FIG. 7A illustrates a cross-sectional view of an exemplary display device in one embodiment.

FIG. 7A illustrates a cross-sectional view of components of an exemplary display device 700 in one embodiment. FIG. 7B illustrates exemplary display 700 as viewed from above. The components of display 700 may be incorporated, for example, into display 102 of display device 100 shown in FIG. 1. Like display 600, display 700 includes a cover glass 704 and an OLED panel 708 with an active area 712 and an inactive area 716. Active area 712 includes an array of LEDs with a film of organic compound that emits light 714. Also like display 600, display 700 includes an OLED panel 708 that is bottom-emitting in that light passes through substrate 718, on which active area 712 sits, before passing through cover glass 704.

Unlike display 600, display 700 includes a driver circuit 728 that is mounted on a PCB 748 rather than on an OLED panel 708 (as in display 600). With respect to the placement of driver circuit 728, display 700 is more like display 500, which also includes driver circuit 528 on PCB 548. Inactive area 712 includes fan-out traces 732 that may be formed on the bottom of OLED panel 708. Fan-out traces 732 include conductors that carry signals, such as control signals, from PCB 748 (originating from driver circuit 728) to active area 712 of OLED panel 708. Fan-out traces 732 are connected to a PCB 748 with an ACF bond at location 752. PCB 748 may be a flexible PCB, a rigid PCB, or a rigid-flex PCB. PCB 748 may also be the system board for mounting major components of the device that includes display 700, such as the CPU, memory, HDD, and/or SSD. Driver circuit 728 may be a DDIC in the form of a chip.

Compared to display 600, the ACF bond at location 752 may be more complex in that there are more conductors (as compared to ACF bond at location 652). Like display 600, bottom-emitting OLED panel 708 allows for PCB 748 to connect to OLED panel 708 without vias (such as vias 340) carrying signals from one side (the bottom) of OLED panel 708 to the other side (top). Display 700 also allows for the connection of PCB 748 and OLED panel 708 without bending inactive area 716 of OLED panel 708. In addition, display 700 allows for the connection of PCB 748 to OLED panel 708 directly (through an ACF bond at location 752) without an FPC (as compared to display 200 of FIG. 2) and without a board-to-board connector, for example. Thus, the embodiment of display 700 may allow for a thinner display with a narrower bezel while making the connections more reliable.

Display 700 shown in FIGS. 7A and 7B is exemplary and display 700 could include more, fewer, different, or a different arrangement of components. For example, rather than employing an ACF bond at location 752 between PCB 748 and inactive area 716, display 700 may employ an FPC (ACF bonded to inactive area 716) and a connector (to connect the additional FPC to PCB 748), similar to the connection shown in FIG. 4A and described for display 400. Further, the components of display 700 are not drawn to scale. Display 700 may include a display panel other than an OLED panel, such as an LCD panel, a QLED panel, an E-ink panel, or any other type of flat panel display.

Figure 8B:
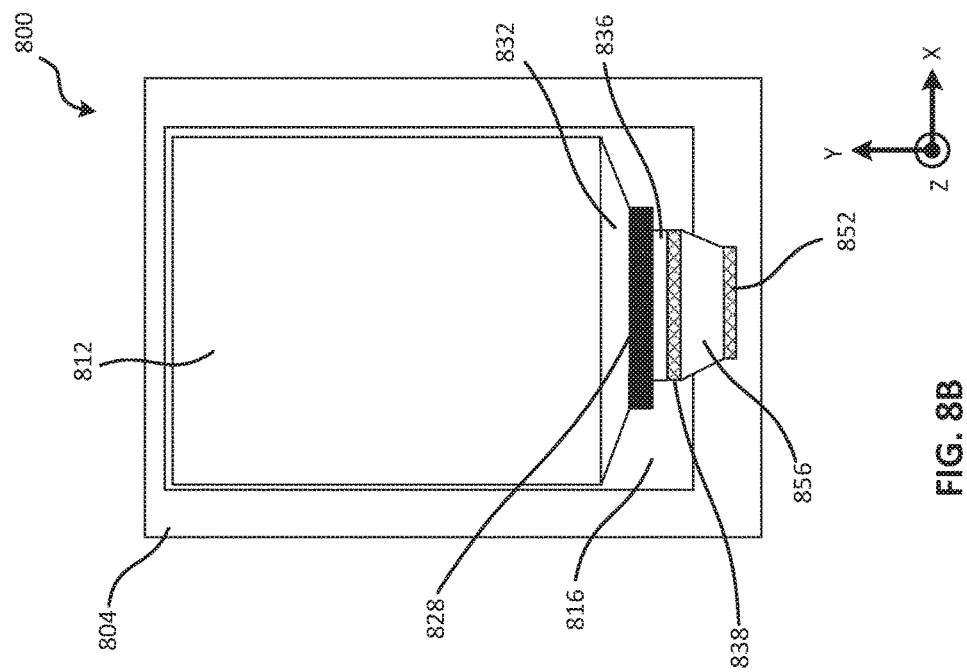
FIG. 8B illustrates the exemplary display of FIG. 8A as viewed from above.
Figure 8A:
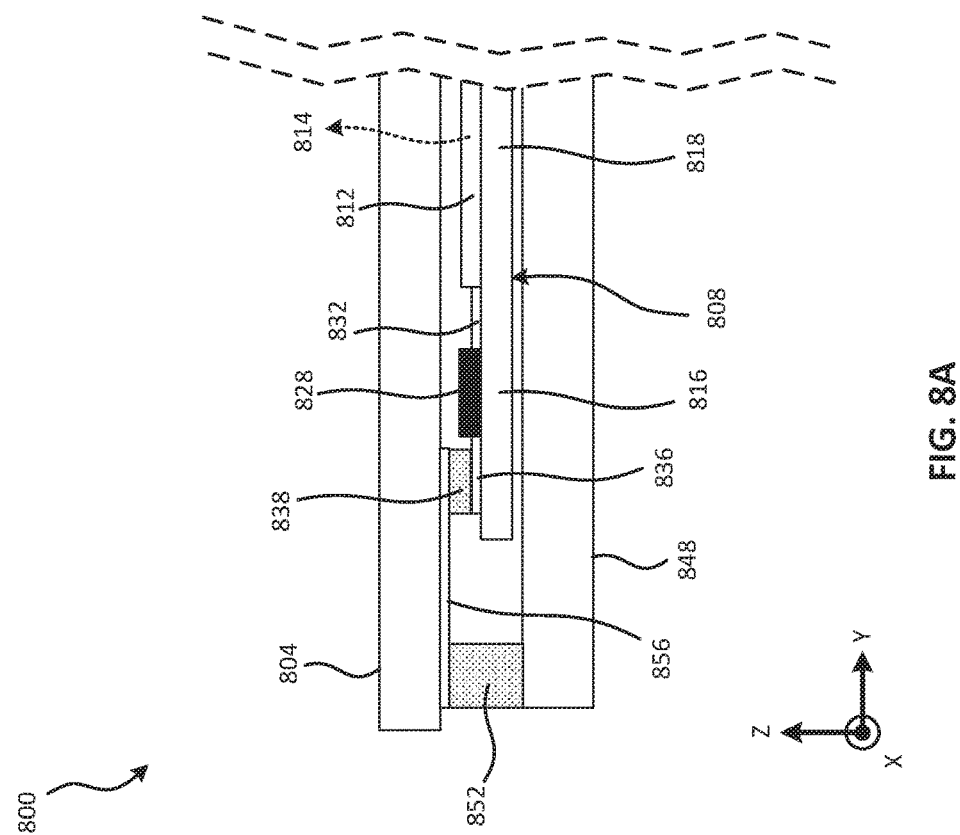
FIG. 8A illustrates a cross-sectional view of an exemplary display device in one embodiment.

FIG. 8A illustrates a cross-sectional view of components of an exemplary display device 800 in one embodiment. FIG. 8B illustrates exemplary display 800 as viewed from above. The components of display 800 may be incorporated, for example, into display 102 of display device 100 shown in FIG. 1. Like displays 300 and 400, display 800 includes a cover glass 804 and a top-emitting OLED panel 808 with an active area 812 and an inactive area 816. Active area 812 includes an array of LEDs with a film of organic compound that emits light 814. OLED panel 808 is top-emitting in that light 814 passes through cover glass 804 without passing through substrate 318 on which active area 812 sits.

Also like displays 300 and 400, display 800 includes a driver circuit 828 that is mounted on OLED panel 808. Driver circuit 828 may be a DDIC in the form of a chip. If OLED panel 808 is plastic, driver circuit 828 can be considered a "chip on panel" or, if OLED panel 808 is glass, driver circuit 828 can be considered a "chip on glass." Inactive area 816 includes fan-out traces 832 and fan-in traces 836 that may be formed on OLED panel 808. Fan-out traces 832 include conductors that carry signals, such as control signals, from driver circuit 828 to active area 812 of OLED panel 808. Fan-in traces 836 include conductors that carry signals, such as control signals, to driver circuit 828.

Unlike displays 300 and 400, OLED panel 808 does not include vias to carry signals from one side of OLED panel 808 to the other. Rather, signals are conveyed from OLED panel 808 to PCB 848 through traces 856 patterned on cover glass 804. Traces 856 are conductive and can carry signals, such as control signals. These fan-in traces 856 on cover glass are coupled to fan-in traces 836 on OLED panel 808 with an ACF bond at location 838. The fan-in traces 856 on cover glass 804 are also connected to PCB 848 with an ACF bond at location 852. Thus, signals (such as control signals) can travel from PCB 848 to OLED panel 808 through traces 856 formed on the bottom of cover glass 804. PCB 848 may be a flexible PCB, a rigid PCB, or a rigid-flex PCB. PCB 848 may also be the system board for mounting major components of the device that includes display 800, such as the CPU, memory, HDD, and/or SSD.

The embodiment of display 800 allows driver circuit 828 to be connected directly to OLED panel 808, potentially reducing the length of fan-out traces 832. In addition, traces 856 on cover glass 804 allow signals to be carried from one side (the bottom) of OLED panel 808 to the other side (top) without vias or bending inactive area 816 of OLED panel 808. In addition, display 800 allows for the connection of PCB 848 to cover glass 804 directly (through an ACF bond at location 852) without an FPC (as compared to display 200 of FIG. 2) and without a board-to-board connector, for example. The embodiment of display 800 may allow for a thinner display with a narrower bezel while making the connections more reliable.

Display 800 shown in FIGS. 8A and 8B is exemplary and display 800 could include more, fewer, different, or a different arrangement of components. For example, rather than employing an ACF bond at location 852 between PCB 848 and cover glass 804, display 800 may employ an FPC (ACF bonded to cover glass 804) and a connector (to connect the additional FPC to PCB 848). Alternatively display 800 may employ an FPC (ACF bonded to PCB 848) and a connector (to connect the additional FPC to cover glass 804). Further, the components of display 800 are not drawn to scale. As another example, driver circuit 828 may be mounted on PCB 848 rather than OLED panel 808 and the traces described above can carry signals, such as control signals, output from driver circuit 828 to active area 812 of OLED panel 808. Display 800 may include a display panel other than an OLED panel, such as an LCD panel, a QLED panel, an E-ink panel, or any other type of flat panel display.

FIGS. 9A, 9B, and 9C illustrates exemplary fan-in traces on cover glass. In one embodiment, cover glass 804 of display 800 takes the form of cover glass 904A shown in FIG. 9A. When cover glass 804 takes the form of cover glass 904A, then cover glass 904A includes location 838A for an ACF bond to OLED panel 808 and cover glass 904A includes location 852A for an ACF bond to PCB 846. As such, cover glass 904A also includes fan-in traces 856A between the two locations 838A, 852A for the ACF bonds.

In another embodiment, cover glass 804 of display 800 takes the form of cover glass 904B shown in FIG. 9B. When cover glass 804 takes the form of cover glass 904B, then cover glass 904B includes location 838B for an ACF bond to OLED panel 808 and cover glass 904A includes location 852B for an ACF bond to PCB 846. As such, cover glass 904A also includes fan-in traces 856B between the two locations 838B, 852B for the ACF bonds. As compared to cover glass 904A in FIG. 9A, cover glass 904B of FIG. 9B biases location 852B for the ACF bond to one side of cover glass 904B. This biasing may allow for more optimal placement of components of the display device housing display 800.

The ability to place fan-in traces on the cover glass allows for the flexible placement of location 852 for the ACF bond from the cover glass to PCB 848 (as shown in FIG. 8A). In FIG. 9C, for example, the location 852C for the ACF bond to OLED panel 808 is on the side of cover glass 904A, while location 852C for the ACF bond to PCB 848 is biased to the left as compared to location 852B of cover glass 904B and location 852A of cover glass 904A.

The embodiments described above are exemplary. In other embodiments, more components, fewer components, different components, or a different arrangement of components are possible. For example, the OLED panel may be replaced or accompanied by a liquid-crystal display (LCD). As another example, the control circuit (such as an integrated control circuit or DDIC) may include a timing controller or TCON. In addition, although displays 300, 400, 500, 600, 700, and 800 are described as a system without an FPC and without a board-to-board connection, displays may include FPCs and board-to-board connections while still incorporating the methods and systems described herein.

No element, act, or instruction used in the description of the present application should be construed as critical or essential to the invention unless explicitly described as such. As used herein, the articles "a" and "the" and the term "one of" are intended to include one or more items. Further, the phrase "based on" means "based, at least in part, on" unless explicitly stated otherwise.

In the preceding specification, various preferred embodiments are described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A device comprising:
a display panel to emit light, wherein the display panel includes traces to carry control signals;
a cover glass to cover the display panel and to pass light from the display panel, wherein the cover glass includes traces to carry the control signals; and
a printed circuit board (PCB) having traces to carry the control signals, the PCB and the cover glass being positioned on opposite sides of the display panel; and
wherein the display panel is connected to the cover glass such that the traces on the display panel are connected to the traces on the cover glass, and
wherein the PCB is connected to the cover glass such that the traces on the PCB are connected to the traces on the cover glass.

2. The device of claim 1, wherein the display panel includes an active area and an inactive area, the device further comprising:
a driver integrated circuit mounted on the inactive area of the display panel.

3. The device of claim 2, wherein the traces on the display panel are fan-in traces, the device further comprising:
fan-out traces to carry control signals from the driver integrated circuit to the active area of the display panel.

4. The device of claim 3, wherein the fan-in traces on the display panel are connected to the cover glass by an anisotropic conductive film (ACF) bond.

5. The device of claim 4, wherein the PCB is connected to the cover glass by an ACF bond.

6. The device of claim 1, further comprising:
a driver integrated circuited mounted on the PCB.

7. The device of claim 6, wherein the PCB is connected to the cover glass by an ACF bond.

8. The device of claim 7, wherein the cover glass is connected to the display panel with an ACF bond.

9. The device of claim 1,
wherein the display panel is connected to the cover glass proximate a first side of the cover glass, and
wherein the printed circuit board (PCB) is connected to the cover glass proximate a second side of the cover glass,
wherein the first side is different than the second side.

10. A device comprising:
a cover glass to cover a display panel and to pass light from the display panel, wherein the cover glass includes traces to carry control signals,
wherein the cover glass is configured to connect to the display panel such that the traces on the display panel are connected to traces on the cover glass, and
wherein the cover glass is configured to connect to a printed circuit board (PCB) such that the traces on the cover glass are connected to the traces on the PCB, the PCB and the cover glass being positioned on opposite sides of the display panel.

11. The device of claim 10, further comprising:
the display panel to emit light, wherein the display panel includes traces to carry control signals.

12. The device of claim 11, wherein the display panel includes an active area and an inactive area, the device further comprising:
a driver integrated circuit mounted on the inactive area of the display panel.

13. The device of claim 12, wherein the traces on the display panel are fan-in traces, the device further comprising:
fan-out traces to carry control signals from the driver integrated circuit to the active area of the display panel.

14. The device of claim 13, wherein the fan-in traces on the display panel are connected to the cover glass by an anisotropic conductive film (ACF) bond.

15. The device of claim 11, further comprising:
the printed circuit board having traces to carry control signals.

16. The device of claim 15, wherein the PCB is connected to the cover glass by an ACF bond.

17. The device of claim 15,
wherein the display panel is connected to the cover glass proximate a first side of the cover glass, and
wherein the printed circuit board (PCB) is connected to the cover glass proximate a second side of the cover glass,
wherein the first side is different than the second side.

18. A device comprising:
a bottom-emitting organic light-emitting diode (OLED) display panel including: an active area coupled to a first surface of a substrate, wherein the active area includes an array of light-emitting diodes (LEDs), and
a driver integrated circuit mounted to the first surface of the substrate to drive the LEDs in the active area of the OLED display panel, wherein the LEDs emit light that passes through the substrate before passing through a cover glass, wherein the OLED display panel is configured to be connected to a printed circuit board (PCB) with an anisotropic conductive film (ACF) bond.

19. The device of claim 18, further comprising:
the printed circuit board (PCB) connected to the OLED display panel with the ACF bond.

20. The device of claim 19, further comprising:
fan-out traces on the inactive area of the OLED display panel, wherein the fan-out traces carry signals from the driver integrated circuit to the active area of the OLED display panel, and
fan-in traces on the inactive area of the OLED display panel, wherein the fan-in traces carry signals from the ACF bond to the driver integrated circuit.

* * * * *